Sept. 26, 1961        E. M. GREER        3,001,268
METHOD OF ASSEMBLING PRESSURE ACCUMULATOR
Filed April 2, 1958
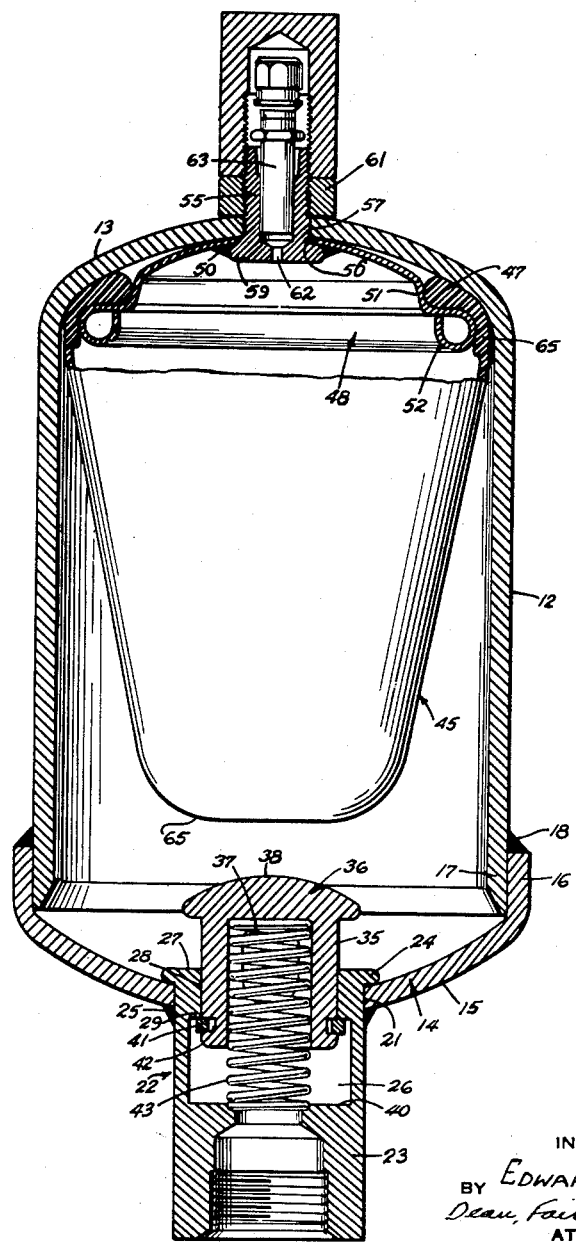
INVENTOR
BY *Edward M Greer*
*Dean, Fairbank & Hirsch*
ATTORNEYS.

3,001,268
METHOD OF ASSEMBLING PRESSURE ACCUMULATOR

Edward M. Greer, Great Neck, N.Y., assignor to Greer Hydraulics, Inc., a corporation of New York
Filed Apr. 2, 1958, Ser. No. 725,986
1 Claim. (Cl. 29—157)

This invention relates to a method of assembling pressure accumulators.

It is among the objects of the invention to provide a simple yet highly effective method of welding an end cap onto a cylindrical shell which contains a deformable bladder of resilient material, which method may readily be performed, without likelihood of injury to the bladder.

According to the invention these objects are accomplished in the manner hereinafter described and particularly recited in the claim.

In the accompanying drawings, the single figure illustrates the type of pressure accumulator formed by the method of the invention.

Referring now to the drawings, the pressure accumulator illustrated is of the type shown and described in copending patent application Serial No. 700,783, filed December 5, 1957, and may comprise a container 12 formed from a cylindrical shell having a curved end wall 13, and a cap 14 also having a curved end wall 15 and having its side wall 16 telescoped over the open end 17 of shell 12 and secured thereto as by welding as at 18.

The cap has an axial opening 21 in its end wall 15 in which is mounted a closure member 22 which controls the flow of fluid from the container.

The closure member 22 comprises a cylindrical body portion 23 of diameter slightly less than that of opening 21 so that it may extend therethrough and has a lateral flange 24 at one end adapted to seat against the inner periphery of opening 21 to prevent outward movement of the closure member from the accumulator. The closure member may be restrained from inward movement in any suitable manner and in the illustrative embodiment, this is accomplished by welding as at 25.

The body portion 23 has an axial bore 26 extending from its inner end 27 and said bore is of reduced diameter as at 28 near its inner end defining an annular shoulder 29.

Slidably mounted in bore 26 is a sleeve 35 which is of outer diameter substantially equal to that of the reduced diameter portion 28 of bore 26 so that it may slide therein with substantially no transverse play. The sleeve 35 is closed at its inner end as at 36 defining a valve head and has a plurality of openings 37 leading thereinto adjacent said valve head 36 for flow of fluid. The valve head desirably is rounded as at 38 and is of diameter greater than that of sleeve 35 so that it may seat on the inner end 27 of the body portion to shut off flow of fluid from the container.

The sleeve 35 is retained in the bore 26 and its inward movement is limited by means of a split snap ring 41 positioned in an annular groove 42 in the periphery of sleeve 35 near its outer end and extending laterally from said groove so as to abut against the shoulder 29.

The sleeve is normally urged into the container by means of a coil spring 43 compressed between floor 40 of bore 26 and the valve head 36 so that openings 37 are exposed for flow of fluid.

The pressure accumulator is provided with a partition 45, illustratively a bladder of resilient material which is substantially conical as shown. To retain the bladder in the container, a clamp plate 48 is provided which desirably is of flexible sheet metal. The plate 48 has a curvature generally corresponding to the curvature of the end wall 13 and has an annular depression 51 adjacent its periphery, the latter desirably being reversely bent as at 52 to impart rigidity to the plate.

The clamp plate 48 is securely retained against end wall 13 by means of a plug 55 which extends through aligned axial openings 56, 57 in plate 48 and end wall 13 and when so retained, as shown, the surface of the clamp plate 48 adjacent its periphery and inwardly thereof will be spaced from the opposed surface of end wall 13.

The plug 55 has a flange 59 at its inner end which seats on the periphery of opening 56 and is desirably welded thereto as at 50 and is externally threaded at its outer end to receive a nut 61 which when tightened will securely retain the portion of clamp plate 48 around its axial opening against end wall 13.

The thickened bead 47 at the mouth of the bladder 45 is positioned in said annular depression 51 and as the diameter of the plate 48 is greater than that of the mouth of the bladder, the mouth portion of said bladder will snugly engage the reversely bent periphery of said plate.

To charge the bladder 45 with fluid, such as a gas under pressure, a passageway 62 is provided through plug 55. The passageway is provided with a valve 63 to retain the bladder charged.

To assemble the accumulator, the plate 48 to which the plug 55 has been previously secured as by welding at 50 is positioned in the mouth of the bladder 45 which snugly engages the periphery of plate 48.

The bladder 45 is then positioned in the shell 12 with the plug 55 extending through the port 57 of the shell and the nut 61 is then screwed on the threaded outer end of the plug to clamp the plate against the end of the shell securely to hold the bladder in position as shown.

The cylindrical body portion 23 is inserted through the opening 21 in end wall 15 of the cap 14 and welded in position at 25. The sleeve 35 with the spring 37 in the bore thereof and with the split ring 41 in annular groove 42 is inserted into bore 25. When the split ring 41 passes shoulder 29 it will move outwardly locking the sleeve in bore 26.

With this sequence of operation it is apparent that the welding operation at 25 is performed before the spring 37 is positioned in body portion 23 thereby preventing damage to the spring by the application of excessive heat in close proximity thereto.

The bladder is then pushed inwardly toward the port 57 so that its free end 65 will be spaced from the open end of the shell 12, and the cap 14 is then positioned over such open end.

The unit thus assembled is mounted in a conventional continuous rotary welding machine which rotates the accumulator about its longitudinal axis while simultaneously welding the joint between the end cap 14 and the shell 12. The free end of the bladder must be adjacent the closed end of the shell while the welding operation is performed and preferably the accumulator is rotated in a horizontal plane to retain the bladder in the desired position.

While the welding operation is performed which does not exceed one minute and is generally in the order of 20–25 seconds, depending upon the materials used, cooling air is forced into the unit through the closure member 22.

After the welding operation is completed, the accumulator is removed from the welding machine and plunged into a tank of running water for cooling of the unit, the interval between the completion of welding and plunging of the accumulator into the water being no more than approximately 10 seconds.

As heat is developed by the welding operation, it will both heat the shell and the air therein. As cooling air is forced into the shell, it will prevent rapid build-up of the temperature therein and as the bladder has been pushed toward the port 57, it will be considerably spaced from the region to be welded so that it will take some time before the portion of the shell adjacent the bladder heats up due to heat transfer therethrough caused by the welding, to reach a temperature that will cause injury of the bladder.

Due to the speed of the welding operation, it will be completed before the temperature of the shell at the portion thereof adjacent the pushed-in bladder has risen to a value that is deleterious to the bladder. Although the temperature of such shell portion will continue to rise even after the welding is completed, as the accumulator has been removed from the welding machine and plunged into the water before such temperature can reach the critical value the blader will not be affected.

With the method above described, accumulators may rapidly be assembled without likelihood of injury to the bladder thereof due to application of excess heat thereto.

As many changes could be made in the above method, and many apparently widely different embodiments of this invention could be made without departing from the scope of the claim, it is intended that all matter contained in the above description, or shown in the accompanying drawings, shall be interpreted as illustrative and not in a limiting sense.

Having thus described my invention, what I claim as new and desire to secure by Letters Patent of the United States is:

The method of assembling pressure accumulators of the type having a substantially cylindrical shell open at one end and with a port through its closed end, said shell having a deformable bladder of resilient material secured at one end in said shell to the port and an end cap having a port, said end cap being secured to the open end of the shell, which comprises the steps of pushing the free end of the bladder toward the closed end of the shell, placing the end cap on the open end of the shell to completely close the latter while retaining the partially assembled pressure accumulator in such position that the free end of the bladder will be adjacent the closed end of the shell, circumferentially welding the joint between the shell and the end cap at the exterior of the pressure vessel only while retaining the pressure accumulator in such aforementioned position and completing the welding in a relatively short period of time such that the temperature of the portion of the shell adjacent the pushed-in bladder will not have risen to a value to injure the bladder and then plunging the welded pressure accumulator into a cooling bath.

References Cited in the file of this patent

UNITED STATES PATENTS

| | | |
|---|---|---|
| 1,613,061 | Smith | Jan. 4, 1927 |
| 2,038,668 | Newson | Apr. 28, 1936 |
| 2,412,271 | Kercher | Dec. 10, 1946 |
| 2,444,312 | Roberds | June 29, 1948 |
| 2,450,120 | Cate | Sept. 28, 1948 |
| 2,464,102 | Schulze | Mar. 8, 1949 |
| 2,539,237 | Dreyer | Jan. 23, 1951 |
| 2,701,778 | Vickery | Feb. 8, 1955 |